United States Patent
Lehmann et al.

(10) Patent No.: US 12,152,138 B2
(45) Date of Patent: Nov. 26, 2024

(54) TRANSPARENT COMPOSITION

(71) Applicant: Evonik Operations GmbH, Essen (DE)

(72) Inventors: Kathrin Lehmann, Leverkusen (DE); Sebastian Hessner, Essen (DE); Angela Nawracala, Bergisch Gladbach (DE); Sadik Amajjahe, Duesseldorf (DE); Stefan Busch, Bochum (DE)

(73) Assignee: Evonik Operations GmbH, Essen (DE)

( * ) Notice: Subject to any disclaimer, the term of this patent is extended or adjusted under 35 U.S.C. 154(b) by 554 days.

(21) Appl. No.: 17/632,849

(22) PCT Filed: Aug. 3, 2020

(86) PCT No.: PCT/EP2020/071776
§ 371 (c)(1),
(2) Date: Feb. 4, 2022

(87) PCT Pub. No.: WO2021/023699
PCT Pub. Date: Feb. 11, 2021

(65) Prior Publication Data
US 2022/0267583 A1 Aug. 25, 2022

(30) Foreign Application Priority Data
Aug. 8, 2019 (EP) .................... 19190668

(51) Int. Cl.
*C08L 33/12* (2006.01)
(52) U.S. Cl.
CPC .................... *C08L 33/12* (2013.01)
(58) Field of Classification Search
CPC ........................................ C08L 33/12
USPC .......................................... 524/269
See application file for complete search history.

(56) References Cited

U.S. PATENT DOCUMENTS

| | | | |
|---|---|---|---|
| 3,429,846 A | 2/1969 | Bechtold et al. | |
| 3,451,838 A | 6/1969 | Burzynski et al. | |
| 3,484,157 A | 12/1969 | Crandon et al. | |
| 3,700,487 A | 10/1972 | Crandon et al. | |
| 3,707,397 A | 12/1972 | Gagnon | |
| 3,762,940 A | 10/1973 | Bechtold | |
| 3,766,299 A | 10/1973 | Dornte | |
| 3,843,390 A | 10/1974 | Hudson et al. | |
| 4,021,505 A | 5/1977 | Wang | |
| 4,719,146 A | 1/1988 | Hohage et al. | |
| 8,962,728 B2 * | 2/2015 | Khrenov | C08L 33/10 |
| | | | 524/588 |
| 8,975,337 B2 | 3/2015 | Hoess et al. | |
| 11,234,441 B2 * | 2/2022 | Hänsel | A01N 55/00 |
| 2013/0203918 A1 * | 8/2013 | Khrenov | C08L 33/08 |
| | | | 524/269 |

FOREIGN PATENT DOCUMENTS

| | | |
|---|---|---|
| DE | 1963278 | 7/1970 |
| DE | 2454076 | 5/1975 |
| DE | 2611782 | 9/1976 |
| DE | 2317874 | 7/1981 |
| DE | 10059454 | 6/2002 |
| EP | 0180129 | 9/1988 |
| EP | 0208734 | 12/1990 |
| EP | 1640418 | 3/2006 |
| GB | 1308697 | 2/1973 |
| NL | 6608316 | 12/1966 |
| WO | 86/04072 | 7/1986 |
| WO | 2005/108486 | 11/2005 |
| WO | 2012/034821 | 3/2012 |
| WO | WO-2017149069 A1 * | 9/2017 ........... A01C 23/007 |
| WO | 2019/233734 | 12/2019 |

OTHER PUBLICATIONS

Ye et al., U.S. Appl. No. 18/708,834, filed May 9, 2024.
U.S. Appl. No. 18/708,834, filed May 9, 2024, Ye et al.
Extended European Search Report issued Jan. 21, 2020 in European Patent Application No. 19190668.4, 7 pages.
International Search Report issued Oct. 13, 2020 in PCT/EP2020/071776, with English translation, 5 pages.
Written Opinion issued Oct. 13, 2020 in PCT/EP2020/071776, with English translation, 9 pages.

\* cited by examiner

*Primary Examiner* — Deve V Hall
(74) *Attorney, Agent, or Firm* — Grüneberg and Myers PLLC

(57) ABSTRACT

Compositions contain a poly(alkyl)(meth)acrylate matrix material and at least one additive, where the transparency is influenced to a minimal degree by the addition of the additive.

20 Claims, No Drawings

TRANSPARENT COMPOSITION

CROSS-REFERENCE TO RELATED APPLICATIONS

This application is the National Stage entry under § 371 of International Application No. PCT/EP2020/071776, filed on Aug. 3, 2020, and which claims the benefit of priority to European Application No. 19190668.4, filed on Aug. 8, 2019. The content of each of these applications is hereby incorporated by reference in its entirety.

BACKGROUND OF THE INVENTION

Field of the Invention

The present invention is directed to compositions consisting of a poly(alkyl)(meth)acrylate matrix material and at least one additive, wherein the transparency is influenced to a minimal degree by the addition of the additive.

Description of Related Art

Transparent plastics components are encountered in numerous applications: for example as panels in domestic appliances, as covers for instruments in motor vehicles, or as displays.

The high optical transparency and the absence of any intrinsic colour of polymethylmethacrylate (PMMA) moulding compounds enables the achievement of a broad spectrum of different colours that are used for decorative covers (for example various panels in the automotive interior and exterior). Furthermore, the use of coloured PMMA moulding compounds can achieve surfaces of the highest quality class with high gloss, which plays an important role for the final applications.

The surfaces of the products produced from PMMA have high hardness, which is of crucial importance for the final use thereof as decorative cover. It is common knowledge that PMMA, among the thermoplastics, is that with the highest surface hardness and scratch resistance, determined by means of the pencil hardness test. Nevertheless, for some applications with particularly high demands on the surfaces, especially in the case of products that are decorative and attract attention, even PMMA shaped bodies must be protected against various wear phenomena. For this purpose, the components are often equipped with a coating.

In general, the sensitivity of plastics bodies to wiping streaks and scratches is a problem since the articles in question become unattractive as a result. Numerous methods of providing plastics with scratch-resistant layers have therefore been developed.

Coating materials used are preferably curable plastics resins. Examples include coatings of polyesters with a dialdehyde (e.g. U.S. Pat. No. 3,484,157), polyurethanes (e.g. DE 2611782), with alkyl titanate (e.g. U.S. Pat. No. 3,700,487), melamine in a wide variety of variations or melamine polyol (e.g. GB 1308697. U.S. Pat. No. 3,862,261). Moreover, acrylic resins of a wide variety of types (e.g. DE 2317874), fluorinated hydrocarbons in a wide variety of combinations and modifications (NL 6608316, DE 1963278, DE 2454076), crosslinked polyalkyleneimine compounds (U.S. Pat. No. 3,766,299) and silicon compounds, especially silicone resins (e.g. BE 821403, U.S. Pat. Nos. 3,451,838, 3,707,397), have been employed for coating. EP 180129 describes a process for coating plastics with scratch-resistant and anti-reflective action, consisting of acrylate or methacrylate polymers, organosilicon polymers or melamine resins.

There have also been descriptions of a wide variety of sol-gel systems which can be used with the aid of plasma methods inter alia. These systems are frequently produced from modified silanes and alkoxides by hydrolysis and condensation processes. Owing to the reactivity of these systems, the storage stability of the coating mixture is usually very short. In addition, radiation-curable coating compositions are also used for coating of plastics substrates. For instance, U.S. Pat. No. 6,420,451 describes radiation-curable coating compositions for the coating of optical substrates, for example lenses, made of various plastics substrates, for example polycarbonate. The coating compositions contain, as well as monofunctional acrylates, urethane acrylates and colloidal metal oxides, especially $SiO_2$ particles.

A common factor to all the methods described is that they require additional and complex operating steps, namely application and curing of the coating system/coating composition, and/or consist of multiple layers.

Specifically for improvement of the scratch resistance of thermoplastic elastomers, especially polyurethanes (TPU), polyamides (PEBA), copolyesters (COPE) and styrenes (S-TPE), EP 1640418 proposed organomodified siloxanes as additives. These siloxanes are added directly to the moulding compound as additive. They form a kind of lubricant film on the surface of the moulding produced from the moulding compound. Damage to the surface is prevented, and so the article that comes into contact with the moulding can slide across the surface. The shaped bodies therefore allegedly do not require any additional coating with a scratch-resistant lacquer.

Closer inspection of EP 1640418 shows that the plastics used therein are very soft plastics compared to PMMA. These have an elastic surface and are therefore intrinsically less sensitive to mechanical contact with sharp or pointed articles. Thus, such elastic polymers place entirely different demands with regard to a scratch-resistant modification than, for example, the very hard surface of PMMA mouldings. There is no pointer in EP 1640418 that organomodified siloxanes can improve the wiping resistance of surfaces of PMMA mouldings.

DE 10059454 proposes additives with siloxane units that are said to improve the scratch resistance of surfaces of mouldings made from different polymers. These are polyester-polysiloxane-modified polyolefins that are obtained by reaction of acid anhydride-grafted polyolefins with hydroxy-functional organopolysiloxanes. These polyester-polysiloxane copolymers are added to the polymer matrix as additive. A disadvantage of this method, however, is the complex preparation of the polyester-polysiloxane copolymers.

WO 2012/034821 claims PMMA-containing moulding compounds and shaped bodies, the scratch resistance of which is increased with polyestersiloxanes. Particular preference is given, as supported in the examples by technical data, to the polyestersiloxanes wherein the polyester moiety has been prepared using hexenol, and hence the connecting element of the polyester itself and the siloxane is a pure alkylene bridge.

SUMMARY OF THE INVENTION

It was an object of the present invention to provide compositions having high scratch resistance, wherein the compositions are preferably to be highly transparent.

Surprisingly, compositions comprising specific polysiloxane-polyester copolymers that have an oxygen-containing bridge between the polyester units and the polysiloxane have both high scratch resistance and high transparency.

The present invention provides compositions consisting of a poly(alkyl)(meth)acrylate matrix material and at least one additive of the formula (I)

$$M^1_{m1}M^2_{m2}D^1_{d1}D^2_{d2} \tag{I}$$

with
$M^1 = [R_3SiO_{1/2}]$
$M^2 = [R_2R^1SiO_{1/2}]$;
$D^1 = [R_2SiO_{2/2}]$;
$D^2 = [RR^1SiO_{2/2}]$ where R, $R^1$, m1, m2, d1 and d2 are as defined below.

Further subjects are moulding compounds and shaped bodies comprising the compositions according to the invention.

The present invention further provides for the use of the shaped bodies of the invention as decorative covering panels or functional installable components, in motor vehicles or consumer electronics or in domestic appliances.

DETAILED DESCRIPTION OF THE INVENTION

The compositions according to the invention, the moulding compounds and shaped bodies according to the invention that comprise the compositions according to the invention and the use according to the invention are described by way of example hereinafter, without any intention that the invention be restricted to these illustrative embodiments. Where ranges, general formulae, or classes of compound are stated below, these are intended to comprise not only the corresponding ranges or groups of compounds explicitly mentioned, but also all subranges and subgroups of compounds which can be obtained by extracting individual values (ranges) or compounds. Where documents are cited within the context of the present description, the entire content thereof is intended to be part of the disclosure content of the present invention. Where percentage figures are given hereinafter, unless stated otherwise, these are figures in % by weight. In the case of compositions, the percentage figures are based on the entire composition unless otherwise stated. Where average values are given hereinafter, unless stated otherwise, these are mass averages (weight averages). Where measured values are given hereinafter, unless stated otherwise, these measured values were determined at a pressure of 101 325 Pa and at a temperature of 25° C.

The various fragments in the formulae (I) and (II) are in statistical distribution. Statistical distributions are of blockwise construction with any desired number of blocks and with any desired sequence or are subject to a randomized distribution; they may also have an alternating construction or else form a gradient over the chain; more particularly they can also form any mixed forms in which groups with different distributions may optionally follow one another. Specific embodiments may lead to restrictions of the statistical distributions as a result of the embodiment. There is no change in the statistical distribution for all regions unaffected by the restriction.

The indices reproduced in the formulae (I) and (II) given here, and the ranges of values for the indices stated, should be understood as the average values of the possible statistical distribution of the structures and/or mixtures thereof that are actually present. This also applies to structural formulae exactly reproduced per se as such.

One advantage of the compositions according to the invention is that mouldings exclusively consisting of the compositions according to the invention have higher transparency, owing to lower opacity, than corresponding prior art compositions.

One advantage of the compositions according to the invention is that transparent plastics mouldings which have high surface quality and which, without an additional scratch-resistant coating or film, have very good resistance to wiping, abrasions and scratches are produced.

A further advantage of the compositions according to the invention is that the addition of the additive alters the colour impression imparted by coloured plastics mouldings only to a very minor degree; the colorimetric values L*, a* and b* in the CieLab system therefore differ only very slightly.

A further advantage of the compositions according to the invention is that dark-coloured plastics parts, particularly blue-, grey-, brown-, black- and anthracite-coloured plastics parts, do not have any haze perceptible to the human eye.

A further advantage of the compositions according to the invention is that the plastics mouldings with a smooth surface have very high gloss values.

The plastics mouldings according to the invention have the advantage that, owing to their resistance to wiping, abrasions and scratches, they are suitable both for the interior and for the exterior.

In the context of the present invention, the terms shaped body and moulding are used synonymously. These are not just produced by injection moulding from the compositions described in accordance with the invention, but also those that are obtained, for example, by continuous extrusion, for example in the form of a profile, film or sheet, or else those products that are created by the thermoforming of a film or a sheet.

Multilayer films or sheets, for example ABS coloured black and transparent PMMA sheet as in automobile construction, in which possibly only the outer layer contains the additive, are also covered by the definition of shaped body and moulding.

"Poly(alkyl)(meth)acrylate" is understood to mean both methacrylates and acrylates; where the esters of acrylic acid are alkyl acrylates, and the same also applies to the esters of methacrylic acid.

The compositions according to the invention consist of
a) a poly(alkyl)(meth)acrylate matrix material
b) at least one additive of the formula (I)

$$M^1_{m1}M^2_{m2}D^1_{d1}D^2_{d2} \tag{I}$$

with
$M^1 = [R_3SiO_{1/2}]$
$M^2 = [R_2R^1SiO_{1/2}]$
$D^1 = [R_2SiO_{2/2}]$
$D^2 = [RR^1SiO_{2/2}]$ where R is independently an alkyl radical or an aromatic or alkylaromatic radical, where the alkyl radicals preferably have 1 to 4 carbon atoms and the aromatic or alkylaromatic radicals preferably have 6 to 8 carbon atoms, $R^1$ is independently —$R^3$—(O—$R^4$)$_p$ where $R^4$ is a polyester radical, $R^3$ is a p+1-valent hydrocarbon interrupted by oxygen atoms, having 3 to 10 carbon atoms, preferably 4 to 8 and especially preferably 5 to 6 carbon atoms, where p=1 to 4, preferably 1 to 2, with d1=5 to 70, preferably 10 to 60, especially preferably 15 to 50,
d2=0 to 20, preferably 1 to 15, more preferably 2 to 10,
m1=0 to 2.
m2=0 to 2, preferably 2,
with the proviso that:

$$m1+m2=2,$$

N=d1+d2+2 is from 10 to 80, preferably from 15 to 70, more preferably from 20 to 60, and $$d2+m2 \geq 1.$$

The values of d1, d2, m1, m2 and N should be understood as being average values in the polymer molecule. The additives to be used in accordance with the invention are preferably in the form of equilibrated mixtures. The indices used in the formulae should be regarded as statistical averages (number averages).

The individual fragments of the formulae (I) and (II) are preferably of statistical construction.

Statistical distributions are of blockwise construction with any desired number of blocks and with any desired sequence or are subject to a randomized distribution; they may also have an alternating construction or else form a gradient over the chain; more particularly they can also form any mixed forms in which groups with different distributions may optionally follow one another. Specific embodiments may lead to restrictions of the statistical distributions as a result of the embodiment. There is no change in the statistical distribution for all regions unaffected by the restriction.

Preferably, the compositions according to the invention consisting of
a) a poly(alkyl)(meth)acrylate matrix material and
b) at least one additive of the formula (I)
are transparent compositions.

Preferably, the percentage of polyester-modified siloxane units in formula (I), i.e. (d2+m2)*100/N, is 4% to 40%, more preferably from 8% to 30%, especially preferably from 10% to 25%.

The $R^3$ radicals are preferably independently saturated or unsaturated oxygen-interrupted hydrocarbons having p+1 binding sites; $R^3$ more preferably consists of the fragments (a) and (b), where the two fragments are bonded to one another via an oxygen atom. The fragments (a) and (b) preferably consist of the elements carbon, oxygen and hydrogen; the fragments (a) and (b) are more preferably free of heteroatoms, i.e. especially free of oxygen atoms.

Fragment (a) preferably comprises saturated or unsaturated hydrocarbons having 2 to 4 carbon atoms, preferably 2 to 3 carbon atoms, and is preferably free of heteroatoms.

Fragment (b) preferably comprises saturated hydrocarbons having 1 to 6 carbon atoms, preferably 2 to 6 carbon atoms, and is preferably free of heteroatoms.

Further more preferably, the $R^3$ radicals, as fragment (a), have at least one ethylene, 1,2-propylene, 1,3-propylene, 1,2-butylene, 1,4-butylene group or but-2-ene-1,2,4-triyl (from Golpanol) and fragment (b) as defined below.

More preferably, the $R^3$ radicals have, as fragment (a), a divalent saturated hydrocarbon consisting of 2 to 4 carbon atoms and hydrogen and, as fragment (b), when p=1 a radical selected from ethylene, 1,2-propylene and 1,3-propylene, and when p=2 a radical selected from prop-1,2,3-triyl (from glycerol), neopentyl (from neopentanol), trimethylolproptriyl (from TMP) radical.

More preferably, the $R^3$ radicals have, as fragment (a), at least one obligatorily divalent saturated radical consisting of 2 to 4 carbon atoms and hydrogen and, as fragment (b), when p=1 a radical selected from ethylene, 1,2-propylene and 1,3-propylene, and when p=2 a radical selected from prop-1,2,3-triyl (from glycerol), neopenttriyl (from neopentanetriol), trimethylolproptriyl (from TMP) radical.

Further more preferably, the $R^3$ radical has a hydrocarbon having 5 to 6 carbon atoms and an oxygen atom, where the fragment (a) is an ethylene or 1,3-propylene group.

The polyester radicals $R^4$ are preferably formed from 3 to 30, more preferably from 4 to 20 and especially preferably from 5 to 15 ester units.

The polyester radicals $R^4$ are preferably formed from acyl radicals of the acids acetic acid, propionic acid, butyric acid, isobutyric acid, valeric acid, 3-methylbutyric acid, caproic acid, oenanthic acid, caprylic acid, 3,5,5-trimethylcaproic acid and the corresponding hydroxy acids or lactones, more preferably valeric acid, 3-methylbutyric acid, caproic acid, oenanthic acid, caprylic acid, 3,5,5-trimethylcaproic acid and the corresponding hydroxy acids or lactones, and more preferably valeric acid and caproic acid and the corresponding hydroxy acids or lactones, especially preferably 5-hydroxyvaleric acid or δ-valerolactone and 6-hydroxycaproic acid or ε-caprolactone.

The polyester radicals $R^4$ may be the same or different in relation to their number of acid radicals.

The polyester radicals $R^4$ have preferably been formed from identical acid radicals. Preferred polyester radicals are those that are obtained by ring-opening (poly)esterification of lactones. Particular preference is given to the polyester radicals that are obtained by (poly)esterification of caprolactones or valerolactones, especially of ε-caprolactone, 3,5,5-trimethylcaprolactone or δ-valerolactone and especially preferably of ε-caprolactone.

More preferably, the polyester radicals $R^4$ have been formed from the same acid radicals with different numbers of acid radicals, and more preferably from 5-hydroxyvaleric acid or δ-valerolactone and 6-hydroxycaproic acid or ε-caprolactone.

Preferably, the $R^1$ radical has the $R^3$ radical as a hydrocarbon having 5 to 6 carbon atoms and one oxygen atom, where the fragment (a) is an ethylene or 1,3-propylene group, and a polyester radical $R^4$ formed from identical acid radicals, where the polyester radical $R^4$ has been formed from 5 to 15 ε-caprolactone and δ-valerolactone units.

Preferred additives of the formula (I) are those in which the polyester radical has been formed from 3 to 30, preferably from 4 to 20 and especially preferably from 5 to 15 ε-caprolactone and/or δ-valerolactone units.

More preferred additives of the formula (I) are those in which the polyester radical has been formed from 3 to 30, preferably from 4 to 20 and more preferably from 5 to 15 ε-caprolactone and/or δ-valerolactone units, where the percentage of polyester-modified siloxane units, i.e. (d2+m2)*100/N, is 5% to 40%, more preferably from 8% to 30%, especially preferably from 10% to 25%.

The preferred additives of the formula (I) have exclusively methyl groups as R. N is 20 to 60, and the polyester radicals $R^4$ therein have been formed from 5 to 15 ester units.

More preferred additives of the formula (I) have exclusively methyl groups as R, N is 20 to 60, and where the $R^1$ radical has the $R^3$ radical as a hydrocarbon having 5 to 6 carbon atoms and one oxygen atom, where the fragment (a) is an ethylene or 1,3-propylene group, and a polyester radical $R^4$ formed from identical acid radicals, where the polyester radical $R^4$ has been formed from 5 to 15 ε-caprolactone and/or δ-valerolactone units.

Particularly preferred additives of the formula (I) have exclusively methyl groups as R, N is 20 to 60, and where the $R^1$ radical has the $R^3$ radical as a hydrocarbon having 5 to 6 carbon atoms and one oxygen atom, where the fragment (a) is an ethylene or 1,3-propylene group, and a polyester radical $R^4$ formed from identical acid radicals, where the polyester radical $R^4$ has been formed from 5 to 15 ε-caprolactone and/or 6-valerolactone units, where the percentage of polyester-modified siloxane units, i.e. (d2+m2)*100/N, is from 8% to 30%, especially preferably from 10% to 25%.

To determine the transparency, shaped bodies consisting exclusively of the compositions according to the invention, i.e. consisting of a poly(alkyl)(meth)acrylate matrix material and at least one additive of formula (I), are produced, where the additives are present preferably to an extent of 1% by weight, 2% by weight or 3% by weight. The shaped bodies are preferably plaques, more preferably plaques having a thickness of 1, 2 or 3 millimetres. Particular preference is given to determining the transparency of plaques having a thickness of 2 mm and having an additive content of 2% by weight. A comparative value used is an analogous plaque without additive.

Transparency is preferably determined as the opacity: more preferably, the opacity is determined with an SP62 from X-Rite, according to the user instructions thereof. There is preferably an increase in opacity compared to the comparative value by not more than 25%, more preferably by not more than 22%, particularly preferably by not more than 19% and especially preferably by not more than 16%; this increase is determined by the formula (opacity {sample}−opacity {comparison})*100%/opacity {comparison}. This increase may also assume negative values if the transparency of the sample has been increased compared to the comparative value. The aforementioned percentages are based on opacity measurements on plaques having a thickness of 2 mm and having an additive content of 2% by weight.

The inventive additives of the formula (I) can be obtained by the known processes by reaction of corresponding hydrosiloxanes with unsaturated hydrocarbons and subsequent (poly)esterification or by direct reaction of unsaturated polyesters with hydrosiloxanes. The reaction can be effected as described in EP 1 640 418 by hydrosilylation/by dehydrogenative hydrosilylation. The preparation of polysiloxanes comprising polyester radicals can be found in EP 0 208 734 for example.

The inventive additives of the formula (I) are preferably reacted in a first step, in the manner of a hydrosilylation of corresponding hydrosiloxanes of the formula (II).

    (II)

with
$M^1 = [R_3SiO_{1/2}]$
$M^2 = [R_2R^HSiO_{1/2}]$
$D^1 = [R_2SiO_{2/2}]$
$D^{2'} = [RR^HSiO_{2/2}]$
where
R is independently an alkyl radical or an aromatic or alkylaromatic radical, where the alkyl radicals preferably have 1 to 4 carbon atoms and the aromatic or alkylaromatic radicals preferably have 6 to 8 carbon atoms,
$R^H$ is hydrogen,
with
d1=5 to 70, preferably 10 to 60, especially preferably 15 to 50,
d2=0 to 20, preferably 1 to 15, more preferably 2 to 10,
m1=0 to 2,
m2=0 to 2, preferably 2,
with the proviso that:

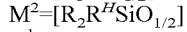

N=d1+d2+2 is from 10 to 80, preferably from 15 to 70, more preferably from 20 to 60, and

with unsaturated compounds $R^{3V}$—(OH)$_p$ where $R^{3V}$ is a p+1-valent unsaturated hydrocarbon radical interrupted by at least one oxygen atom, where this hydrocarbon radical preferably has uninterrupted alkylene units having 1 to 6 carbon atoms, more preferably 2 to 5 carbon atoms,
where p=1 to 4, preferably 1 to 2,
with a catalyst suitable for hydrosilylation,
and, in a second step, the OH groups of the $R^3$ radical are reacted with acid radical monomers, preferably anhydrides, esters and lactones, especially preferably lactones,
where all indices and radicals are as defined above for formula (I), including in their preferences.

The compositions according to the invention consist preferably to an extent of 0.05% by weight to 10% by weight, more preferably to an extent of 0.1% by weight to 5% by weight, especially preferably to an extent of 0.5% by weight to 3% by weight, of the additive of the formula (I), based on the overall composition.

Preferably, the moulding compounds and shaped bodies according to the invention, as well as the compositions according to the invention, include auxiliaries and fillers, more preferably not more than 10% by weight, especially preferably not more than 5% by weight and in particular not more than 2% by weight of auxiliaries and fillers.

The moulding compounds and shaped bodies according to the invention comprise, as well as the compositions according to the invention and the auxiliaries and fillers, further additions such as colorants selected from organic dyes and pigments, light stabilizers selected from UV stabilizers, UV absorbers and IR absorbents, active antimicrobial ingredients, flame retardants, thermal stabilizers, antioxidants, crosslinking polymers and/or fibre-reinforcing additives that are organic or inorganic in nature, and impact modifiers.

Preference is given to selecting dyes as colouring components.

In a particularly preferred embodiment, the moulding compounds according to the invention or the shaped body contain(s) an impact modifier, especially in a proportion of 0.1% to 15% by weight, preferably 0.5% to 10% by weight and most preferably 1% to 6% by weight, based in each case on the total mass of the moulding compound or shaped body. It is possible to use all commercial impact modifiers, especially elastomer particles having an average particle diameter of 10 to 300 nm (measurements by the ultracentrifuge method for example). Preferably, the elastomer particles have a core having a soft elastomer phase and at least one hard phase bound thereto.

The poly(alkyl)(meth)acrylate matrix material used as component a) in accordance with the invention preferably comprises homo- or copolymers of methyl methacrylate. Mixtures and blends composed of different poly(alkyl)(meth)acrylates and other polymers are likewise encompassed by the invention. The present invention also provides a copolymer of at least one poly(alkyl)(meth)acrylate and further comonomers. Component a) according to the invention is not a thermoplastic elastomer.

"Alkyl" is understood here to mean branched or unbranched, cyclic or linear alkyl radicals having 1 to 20, preferably 1 to 8, more preferably 1 to 4, carbon atoms, which may be substituted by functional groups or may have heteroatoms such as O, S or N, preferably O or N, more preferably O. Preference is given to a methyl, ethyl, butyl or cyclohexyl radical.

The matrix material a) may be a homopolymer, a copolymer or mixtures thereof. For instance, at least one component of the matrix material may have been polymerized from methyl methacrylate to an extent of 50% to 100% by weight, preferably to an extent of 80% to 100% by weight, more preferably to an extent of 90% to 100% by weight, especially preferably further more preferably 95% to 100% by weight, and especially to an extent of 99% to 100% by weight. 100% by weight corresponds to a homopolymer, lower concentrations correspond to a copolymer. This component (main component) is present in the matrix material to an extent of at least 50% by weight to 100% by weight, preferably from 70% to 95% by weight, more preferably from 80% to 90% by weight.

Further polymerization monomers are preferably styrene, α-methylstyrene, C2- to C4-alkyl (meth)acrylates and maleic anhydride. Preferred alkyl (meth)acrylates are ethyl acrylate and butyl acrylate, especially n-butyl acrylate. These polymerization monomers are preferably polymerized to an extent of 1% to 50% by weight, more preferably to an extent of more than 1% up to 20% by weight and especially to an extent of 5% to 10% by weight.

Particularly preferred proportions have been found to be:
65% to 85%, preferably 70% to 80%, by weight of methyl methacrylate,
10% to 20%, preferably 12% to 18%, by weight of styrene and
5% to 15%, preferably 8% to 12%, by weight of maleic anhydride,
where the present invention includes only those combinations of the three monomers that add up to a total of 100% by weight. It is theoretically also possible to use the abovementioned figures to create three-component combinations that add up to less or more than 100% by weight, but these are not part of the present invention. Combinations according to the invention can be ascertained in a simple manner by a person skilled in the art within the scope of the abovementioned ranges.

The main component of matrix material a) preferably has a molecular weight Mw (weight-average) in the range from 40 000 to 280 000 g/mol and more preferably in the range from 60 000 to 140 000 g/mol (determination of Mw by means of gel permeation chromatography with reference to polymethylmethacrylate as calibration standard).

The main component of the matrix material a) preferably has a solution viscosity in chloroform at 25° C. (ISO 1628—Part 6) of not more than 55, preferably not more than 50, especially 40 to 55 and more preferably of 43-50 ml/g.

Details of the mixture described above and of the preparation of the individual polymers and the polymer mixture can be taken from WO 2005/108486. For avoidance of repetition, the subject-matter of WO 2005/108486 is hereby incorporated explicitly into the description of the present application.

The additives of the formula (I) can be incorporated by any methods known to the person skilled in the art. For instance, the matrix material is premixed with the additive of the formula (I) and possible other ingredients. Premixing is accomplished using mixing equipment, for example Henschel or tumbling mixers.

Subsequently, the premixture is homogenized by melting or by the action of shear forces. This is preferably accomplished by the action of shear forces in a kneader or extruder.

Preferred processes for producing mouldings are injection moulding, thermoforming, calendering or extrusion, with particular preference for various embodiments of the injection moulding method and of calendering.

The shaped bodies of the invention are preferably produced entirely from the moulding compound according to the invention.

However, the component may also be a multipart component, produced, for example, by coextrusion, multicomponent injection moulding, etc., in which only one or multiple parts/layers of the shaped body are produced from the moulding compound according to the invention. In this case, the proportion of the moulding compound according to the invention in the overall shaped body is preferably 0.1% to 99.9% by weight, more preferably 10% to 30% by weight.

One feature of the shaped bodies according to the invention is that they have a surface of the highest quality and, with the aid of the polymethylmethacrylate and the addition of the abovementioned additives, can be protected from damage or from loss of surface quality.

Even though the particular advantage of the mouldings according to the invention is considered to be that the surface is scratch- and wipe-resistant, this nevertheless does not rule out coating of the mouldings produced in accordance with the invention wholly or partly with a film or a paint.

The mouldings according to the invention are preferably used as decorative covering panels or functional installable components, in motor vehicles, consumer electronics or domestic appliances.

Test Methods:
Measurement of Gloss:

The measurement of gloss is conducted in accordance with DIN 67530 at various angles of incidence (20°, 60°, 85°). Gloss refers to the component of light reflected in a regular manner, based on a light beam incident at a defined angle of 20°, 60° or 85° to the perpendicular. The measurement is conducted with a micro-gloss instrument from Byk-Gardner (Wesel). In the measurement of gloss of plastics films, a black sheet of paper is used as background. Gloss is reported in gloss units (GE) based on a black glass standard. The surface gloss value should be at a maximum.

Determination of Opacity:

Opacity is the measure of optical transparency of paper, films, printing inks and other layers. The measurements are conducted with the SP62 from X-Rite according to the user instructions thereof.

Determination of Lightness Value L*:

Lightness values L* are determined by means of a spectrophotometer (SP 62, from X-Rite).

Determination of Wipe Resistance:

To determine wipe resistance, the plastic plaques produced are tested by means of a Crockmaster 670 (James H. Heal, UK) to EN ISO 105-X12 or BS 1006 X12. For this purpose, the plate is wiped with a crocking cloth and an applied weight of 9 N for a defined number of strokes (forward/backward). The assessment is made visually; a mark is awarded from 1 for very good to 5 for unsatisfactory, with 1 meaning no trace, 2 perceptible, 3 slightly scratched, 4 highly scratched and 5 very highly scratched.

Determination of Scratch Resistance:

By means of the Taber 710 multi-finger tester (from Elcometer), the test is conducted to BN 108-13 or GMN 3943. What is determined is whether a tip (diameter 1 mm)

with a different applied weight resulting in 2, 5, 10, 12 and 15 N leads to a visually perceptible scratch. The five tips move here at 7.5 metres per minute over the surface to be scratched. Surfaces of shaped bodies according to the invention have fewer scratches or less deep scratches than surfaces of shaped bodies not according to the invention.

Example 1: Preparation

Example 1.1. Synthesis

The additives of Table 1 were produced in accordance with example 1 of WO 1986/004072; the details in column E result from the metered addition.

For preparation of sample 12 (table 1), a four-neck flask equipped with a precision glass stirrer, reflux condenser and thermometer was charged with 395.7 g of anhydrous ε-caprolactone and 204.3 g of a poly(methyl, hydroxyethylpropoxy)(dimethyl)siloxane copolymer having an OH number of 68 mg KOH/g, and heated to 140° C. while stirring. At 140° C., 0.3 g of tin(II) octanoate was added and exothermicity was permitted up to 150° C. After a reaction time of 7 h at 145° C., the viscous liquid product was cooled down to about 70° C. and poured out into a metal tank for cooling. After cooling to room temperature, a solid colorless product having a residual caprolactone content determined by 1H NMR of not more than 0.3% was obtained.

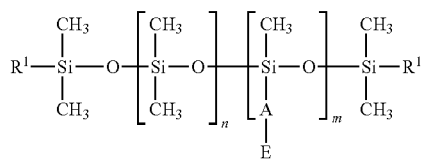

TABLE 1

Additives according to Example 1; the generic parameters reported are based on the formula shown above; the fragments in column A are bonded to the left-hand valence of the silicone polymer

| Sample | R$^1$ | A | E | n | m |
|---|---|---|---|---|---|
| 1 | —A—E | —(CH$_2$)$_6$—O— | 20 × capryl | 28 | 0 |
| 2 | —A—E | —(CH$_2$)$_6$—O— | 14 × capryl | 20 | 0 |
| 3 | —A—E | —(CH$_2$)$_6$—O— | 6 × capryl | 13 | 5 |
| 4 | —CH$_3$ | —(CH$_2$)$_6$—O— | 14 × capryl | 43 | 5 |
| 5 | —A—E | —(CH$_2$)$_6$—O— | 14 × capryl + 6 × valeryl | 28 | 0 |
| 7 | —A—E | —(CH$_2$)$_3$—O—(CH$_2$)$_2$—O— | 20 × capryl | 28 | 0 |
| 8 | —A—E | —(CH$_2$)$_2$—O—(CH$_2$)$_4$—O— | 20 × capryl | 28 | 0 |
| 9 | —A—E | -propoxy - glyceryl | 10 × capryl | 28 | 0 |
| 10 | —A—E | -propoxy - TMP | 10 × capryl | 28 | 0 |
| 11 | —A—E | —(CH$_2$)$_3$—O—(CH$_2$)$_2$—O— | 6 × capryl | 13 | 5 |
| 12 | —CH$_3$ | —(CH$_2$)$_3$—O—(CH$_2$)$_2$—O— | 14 × capryl | 43 | 5 |
| 13 | —A—E | —(CH$_2$)$_3$—O—(CH$_2$)$_2$—O— | 14 × capryl + 6 × valeryl | 28 | 0 |

Noninventive compounds are samples 1 to 5.
The propoxy—glyceryl radical corresponds to:

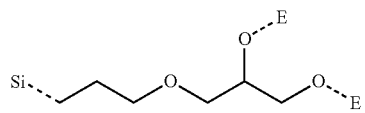

The propoxy—TMP radical corresponds to:

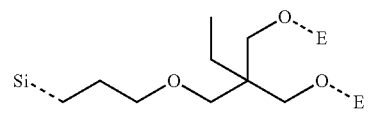

The E radicals of samples 1 to 13 bear a terminal hydroxyl group.

Example 1.2. Production of the Compounds

For production of the compounds, 3 kg of PMMA is mixed with the appropriate proportions of the additives according to Example 1.1 in a Henschel mixer (volume of 4 litres) for 5 minutes and then introduced into the main intake of the extrusion line. Extrusion is effected in a 27 mm twin-screw extruder (co-rotating compounding screw with an L/D ratio=40 from Leistritz). The temperature profile was taken from the respective data sheet of the PMMA; PLEXIGLAS® FT 15, PLEXIGLAS® 8N and PLEXIGLAS® 8N 9V002 (black) (trade marks of Evonik, Germany) were sourced from Evonik Röhm GmbH.

Example 2: Production and Testing of the Optical Properties of Mouldings

The moulding compounds produced in Example 1 were processed on an injection moulding machine to give plaques of size 6 cm×6 cm with different thickness. These plaques were examined for their optical properties (opacity and L* values) with an SP 62 from X-rite. The L* values were recorded against a black background of a Leneta film; the black background had an L* value of 27.41. Samples 14 and 15 from results tables 2 and 3 are each the values for PLEXIGLAS without additive, where it becomes clear with values in the region of 40 units for L* that even transparent PMMA without additive already brings about a significant change because the light is partially altered by the PMMA layer before it hits the black background. Thus, the higher the L* value of the sample, the greater the loss of transparency in the material. This increase in the L* value is then also accompanied by an increase in the opacity value, but this is a reduction in transparency.

TABLE 2

Opacity (abbreviated to "Opac.") and L* values according to Example 2 in PLEXIGLAS FT 15 with different concentrations of additive and different layer thicknesses (SD), concentration figures in % by weight based on the composition; sample 14 corresponds to the matrix polymer without any additive

| | 1% additive SD 2 mm | | 2% additive SD 2 mm | | 3% additive SD 2 mm | | 2% additive SD 0.60 mm | |
|---|---|---|---|---|---|---|---|---|
| Comp. | Opac. | L* value | Opac. | L* value | Opac. | L* value | Opac. | L* value |
| 1 | 18.4 | 43.17 | 23.7 | 45.27 | 28.8 | 48.55 | 20.4 | 44.89 |
| 2 | 18.1 | 43.04 | 22.3 | 45.01 | 27.5 | 47.89 | | |
| 3 | | | 19.8 | 44.54 | | | | |
| 4 | | | 19.9 | 44.79 | | | | |
| 5 | 18.2 | 42.75 | 22.3 | 44.92 | 26.7 | 47.53 | 20.0 | 44.51 |
| 7 | 16.2 | 41.55 | 18.0 | 42.10 | 20.8 | 44.17 | 15.1 | 41.09 |
| 8 | 16.9 | 41.48 | 17.1 | 41.88 | 20.2 | 43.81 | | |
| 9 | 16.5 | 41.54 | 17.5 | 42.01 | | | | |
| 10 | | | 17.2 | 42.17 | | | | |
| 11 | | | 16.4 | 41.48 | | | | |
| 12 | | | 17.9 | 42.31 | 21.9 | 44.27 | 14.1 | 40.54 |
| 14 | 15.6 | 41.24 | 15.6 | 41.24 | 15.6 | 41.24 | 14.1 | 40.20 |

TABLE 3

Opacity (abbreviated to "Opac.") and L* values according to Example 2 in PLEXIGLAS 8N with different concentrations of additive and different layer thicknesses (SD), concentration figures in % by weight based on the composition; sample 15 corresponds to the matrix polymer without any additive

| | 1% additive SD, 2 mm | | 2% additive SD, 2 mm | | 2% additive 0.60 mm | |
|---|---|---|---|---|---|---|
| Comp. | Opac. | L* value | Opac. | L* value | Opac. | L* value |
| 1 | 19.9 | 44.01 | 27.3 | 48.10 | 23.1 | 44.85 |
| 2 | 20.1 | 44.92 | 27.1 | 47.92 | 22.9 | 44.78 |
| 5 | 20.5 | 44.81 | 28.0 | 48.72 | 23.6 | 45.17 |
| 7 | 16.5 | 41.57 | 19.2 | 42.76 | 16.2 | 40.81 |
| 8 | 16.9 | 41.44 | 18.9 | 43.31 | 15.8 | 40.72 |
| 12 | 16.1 | 40.87 | 19.7 | 43.54 | 17.0 | 41.57 |
| 15 | 16.3 | 41.05 | 16.3 | 41.05 | | |

The examples in Tables 2 and 3 show that the compositions according to the invention have lower values across the board in opacity and also in the L* value than exhibited by the noninventive compositions. Thus, the plastic plaques produced using the compositions according to the invention are much clearer and less hazy than using prior art compositions.

Example 2: Testing of Mechanical Properties

To determine wiping resistance, the plastic plaques produced according to Example 2 were tested by means of a Crockmaster 670 (James H. Heal, UK) to EN ISO 105-X12 or BS 1006 X12. For this purpose, the plate with a crocking cloth and an applied weight of 9 N was used to apply a defined number of wiping strokes (forward/backward), with 100, 250 and 500 strokes in three experiments. The assessment is made visually; a mark is awarded from 1 for very good to 5 for unsatisfactory, with 1 meaning no trace, 2 perceptible, 3 slightly scratched, 4 highly scratched and 5 very highly scratched.

TABLE 4

Wiping resistance according to Example 3 of transparent, uncoloured PLEXIGLAS ® 8N with different concentrations of additive

| | 1% additive | | | 2% additive | | |
|---|---|---|---|---|---|---|
| Comp. | 100 | 250 | 500 | 100 | 250 | 500 |
| 1 | 4 | 5 | 5 | 4 | 5 | 5 |
| 7 | 3 | 3 | 4 | 2 | 2 | 2 |
| 8 | 3 | 3 | 4 | 2 | 2 | 3 |
| 15 | 4 | 5 | 5 | 4 | 5 | 5 |

Samples 7 and 8 according to the invention show a distinct increase in wiping resistance compared to the untreated material, and also compared to the prior art additive.

The invention claimed is:
1. A composition, consisting of:
a poly(alkyl)(meth)acrylate matrix material, and
at least one additive of the formula (I)

$$M^1{}_{m1}M^2{}_{m2}D^1{}_{d1}D^2{}_{d2} \qquad (I)$$

with
$M^1=[R_3SiO_{1/2}]$
$M^2=[R_2R^1SiO_{1/2}]$
$D^1=[R_2SiO_{2/2}]$
$D^2=[RR^1SiO_{2/2}]$
wherein
R is independently an alkyl radical or an aromatic or alkylaromatic radical,
$R^1$ is independently $-R^3-(O-R^4)_p$
wherein
$R^4$ is a polyester radical,
$R^3$ is a p+1-valent hydrocarbon interrupted by oxygen atoms, having 3 to 10 carbon atoms, and
p is 1 to 4,
with
d1=5 to 70,
d2=0 to 20,
m1=0 to 2,
m2=0 to 2,
with the proviso that:

$m1+m2=2,$ $N = d1+d2+2 = 10$ to 80, and $d2+m2 \geq 1$.

2. The composition according to claim 1, wherein in formula (I), $(d2+m2)*100/N$ is from 4% to 40%.

3. The composition according to claim 1, wherein the $R^3$ in formula (I) are independently saturated or unsaturated oxygen-interrupted hydrocarbons having p+1 binding sites, where $R^3$ consists of fragments (a) and (b), where the fragments (a) and (b) are bonded to one another via oxygen atoms.

4. The composition according to claim 3, wherein fragment (a) has saturated or unsaturated hydrocarbons having 2 to 4 carbon atoms, and fragment (b) has saturated hydrocarbons having 1 to 6 carbon atoms, and both fragments (a) and (b) are free of heteroatoms.

5. The composition according to claim 1, wherein the polyester radicals $R^4$ are formed from 3 to 30 ester units.

6. The composition according to claim 1, wherein the polyester radicals $R^4$ are formed from an acyl radical of one or more of acetic acid, propionic acid, butyric acid, isobutyric acid, valeric acid, 3-methylbutyric acid, caproic acid, oenanthic acid, caprylic acid, 3,5,5-trimethylcaproic acid, or a corresponding hydroxy acid or lactone.

7. The composition according to claim 1, wherein the composition consists to an extent of 0.05% by weight to 10% by weight, of the at least one additive of the formula (I), based on the overall composition.

8. A moulding compound or shaped body, comprising the composition according to claim 1.

9. The moulding compound or shaped body according to claim 8, further comprising an impact modifier.

10. The moulding compound or shaped body according to claim 8, wherein the poly(alkyl)(meth)acrylate matrix material is a homopolymer, a copolymer, or a mixture thereof, where at least one component of the poly(alkyl)(meth)acrylate matrix material is a polymer of methyl methacrylate to an extent of 50% to 100% by weight.

11. The moulding compound or shaped body according to claim 8, wherein the moulding compound or shaped body contains an auxiliary, a filler, or a further addition.

12. The moulding compound or shaped body according to claim 8, wherein the moulding compound or shaped body is in a form of a decorative covering panel or functional installable component in a motor vehicle, consumer electronic, or domestic appliance.

13. The composition according to claim 1, wherein in the formula (I), R is independently an alkyl radical having 1 to 4 carbon atoms, or an aromatic or alkylaromatic radical having 6 to 8 carbon atoms.

14. The composition according to claim 4, wherein fragment (a) has saturated or unsaturated hydrocarbons having 2 to 3 carbon atoms, and fragment (b) has saturated hydrocarbons having 2 to 6 carbon atoms.

15. The composition according to claim 5, wherein the polyester radical $R^4$ is formed from 5 to 15 ester units.

16. The composition according to claim 6, wherein the polyester radical $R^4$ is formed from an acyl radical of an acid selected from the group consisting of valeric acid, caproic acid, and a corresponding hydroxy acid or lactone.

17. The composition according to claim 7, wherein the composition consists to an extent of 0.5% by weight to 3% by weight, of the at least one additive of the formula (I), based on the overall composition.

18. The moulding compound or shaped body according to claim 9, comprising the impact modifier in a proportion of 0.1% to 15% by weight, based on a total mass of the moulding compound or shaped body.

19. The moulding compound or shaped body according to claim 10, wherein the poly(alkyl)(meth)acrylate matrix material comprises the polymer of methyl methacrylate to an extent of 99% to 100% by weight.

20. The moulding compound or shaped body according to claim 11, wherein the further addition is a colorant.

\* \* \* \* \*